United States Patent
Linker et al.

(10) Patent No.: US 12,091,843 B2
(45) Date of Patent: Sep. 17, 2024

(54) SANITARY FITTING WITH MIXING VALVE AND VALVE

(71) Applicant: Grohe AG, Hemer (DE)

(72) Inventors: Natalia Linker, Hemer (DE); Matthias Schlueter, Dortmund (DE); David Mainka, Iserlohn (DE)

(73) Assignee: Grohe AG, Hemer (DE)

( * ) Notice: Subject to any disclaimer, the term of this patent is extended or adjusted under 35 U.S.C. 154(b) by 482 days.

(21) Appl. No.: 17/328,698

(22) Filed: May 24, 2021

(65) Prior Publication Data

US 2021/0277636 A1  Sep. 9, 2021

Related U.S. Application Data

(63) Continuation of application No. PCT/EP2019/080833, filed on Nov. 11, 2019.

(30) Foreign Application Priority Data

Nov. 23, 2018 (DE) .................... 10 2018 129 625.8

(51) Int. Cl.
  *E03C 1/04* (2006.01)
  *F16K 11/078* (2006.01)
(52) U.S. Cl.
  CPC ............ *E03C 1/04* (2013.01); *F16K 11/0782* (2013.01)
(58) Field of Classification Search
  CPC ....... E03C 1/04; E03C 1/0412; F16K 11/0782
  See application file for complete search history.

(56) References Cited

U.S. PATENT DOCUMENTS

| | | | | |
|---|---|---|---|---|
| 4,762,273 A | * | 8/1988 | Gregory | E03C 1/057 236/93 R |
| 10,328,517 B2 | * | 6/2019 | Chantry | B23K 9/296 |
| 2003/0102256 A1 | * | 6/2003 | Takagi | E03C 1/04 210/101 |
| 2013/0221115 A1 | * | 8/2013 | Blattner | E03C 1/021 137/359 |
| 2013/0221131 A1 | * | 8/2013 | Balkau | E03C 1/023 239/443 |
| 2016/0362876 A1 | * | 12/2016 | Mainka | E03C 1/04 |
| 2017/0211261 A1 | | 7/2017 | Fuseya et al. | |
| 2018/0073224 A1 | * | 3/2018 | Bornovolokov | F16K 3/08 |

FOREIGN PATENT DOCUMENTS

| | | |
|---|---|---|
| CA | 2429241 A1 | 11/2004 |
| DE | 20308906 U1 | 9/2003 |
| DE | 102014008333 A1 | 12/2015 |
| EP | 3205782 A1 | 8/2017 |
| GB | 2429760 A | 3/2007 |

OTHER PUBLICATIONS

International Search Report dated Feb. 17, 2020 in corresponding application PCT/EP2019/080833.

* cited by examiner

*Primary Examiner* — Patrick C Williams
(74) *Attorney, Agent, or Firm* — Muncy, Geissler, Olds & Lowe, P.C.

(57) ABSTRACT

A sanitary fitting having a fitting housing, a mixing valve for mixing cold water and hot water to produce mixed water, a setting element for setting a mixed water temperature of the mixed water, the setting element being adjustable along a surface of the fitting housing, and a mixed water channel through which the mixed water can be conveyed from the mixing valve to a valve, it being possible to set a removal volume of the mixed water via said valve.

12 Claims, 3 Drawing Sheets

SANITARY FITTING WITH MIXING VALVE AND VALVE

This nonprovisional application is a continuation of International Application No. PCT/EP2019/080833, which was filed on Nov. 11, 2019 and which claims priority to German Patent Application No. 10 2018 129 625.8, which was filed in Germany on Nov. 23, 2018 and which are both herein incorporated by reference.

BACKGROUND OF THE INVENTION

Field of the Invention

The present invention relates to a sanitary fitting which is used to provide mixed water as required at a bathroom sink, kitchen sink, shower, and/or bathtub.

Description of the Background Art

Sanitary fittings have a fitting housing which is made of (cast) metal and/or plastic and in which a mixing valve is routinely disposed, by means of which cold water and hot water can be mixed to form mixed water. The mixing valve can be, for example, a mixing cartridge which is used to set at least one property of the mixed water, such as, for example, a desired mixed water temperature. For this purpose, the mixing valve can be actuated, for example, by a lever of the sanitary fitting. It is disadvantageous of such levers that the sanitary fitting must be disposed at a relatively great distance from a wall in order to ensure the free movability for the lever. Furthermore, such sanitary fittings can have a further valve in the outlet by means of which the removal of the mixed water from the sanitary fitting can be activated and deactivated. It is disadvantageous of such sanitary fittings that the removal of the mixed water from the sanitary fitting can only be activated by means of the valve if the mixing valve is simultaneously opened via the lever. This leads to additional operating effort.

SUMMARY OF THE INVENTION

It is therefore an object of the present invention to solve at least partially the problems described with regard to the state of the art, and in particular to provide a sanitary fitting which can be mounted close to a wall and can be operated with little effort.

In an exemplary embodiment, a sanitary fitting is provided that includes the following components: a fitting housing; a mixing valve for mixing cold water and hot water to produce mixed water; a setting element for setting a mixed water temperature of the mixed water, the setting element being adjustable along a surface of the fitting housing; and a mixed water channel through which the mixed water can be conducted from the mixing valve to a valve, it being possible to set to set a removal volume of the mixed water via said valve.

The sanitary fitting is used to provide water to a kitchen sink, bathroom sink, shower, and/or bathtub. The sanitary fitting has a fitting housing which preferably is formed at least partially of (cast) metal, such as, for example, brass, and/or plastic. The fitting housing also comprises an outlet which is attached to the rest of the fitting housing rigidly or movably, in particular pivotably and/or at least partially extendable. The outlet is therefore part of the fitting housing.

Furthermore, the sanitary fitting has a mixing valve for mixing cold water and hot water to form mixed water, wherein the mixing valve can be a mixing cartridge, for example. To set a desired mixed water temperature of the combined mixed water, the mixing valve can be actuated by a setting element. To set the desired mixed water temperature, in particular a mixing ratio between the cold water, which has a cold water temperature, and hot water, which has a hot water temperature, can be set using the setting element, so that the mixing valve mixes the mixed water with a desired mixed water temperature. The cold water temperature is in particular at most 25° C. (Celsius), preferably 1° C. to 25° C., particularly preferably 5° C. to 20° C., and/or the hot water temperature is in particular at most 90° C., preferably 25° C. to 90° C., particularly preferably 55° C. to 65° C. To set the mixed water temperature, the setting element can be adjusted along a surface of the fitting housing. The setting element can be movable and/or rotatable, for example, along the surface of the fitting housing. Furthermore, the setting element and/or the mixing valve can be disposed between two sections of the fitting housing (in particular in the direction of a longitudinal axis of the fitting housing and/or an axis of rotation of the setting element). In other words, the setting element can thus be surrounded (at least partially) by the fitting housing on two sides. Because the outlet is part of the fitting housing, the setting element and/or the mixing valve can also be disposed at the outlet of the fitting housing. In this case, the setting element can be movable and/or rotatable, for example, along a surface of the outlet. Furthermore, in this case the setting element and/or the mixing valve can be disposed between two sections of the outlet (in particular in the direction of a longitudinal axis of the outlet and/or the axis of rotation of the setting element). The setting element and/or the mixing valve can, however, also be disposed at one (in particular the longitudinal) end of the outlet. The outlet can be formed T-shaped (in particular at a longitudinal end). In the case of an outlet that can be pulled out of the fitting housing, this particularly facilitates the pulling out of the outlet. In particular, the setting element is not a (tiltable) lever. The setting element can in particular have a handle, for example, in the manner of a pin or the like, with which the setting element can be moved. The position of the handle can in particular be changed so that the handle cannot strike a wall when the setting element is operated after the sanitary fitting has been installed. The setting element is easier to adjust due to the handle. Furthermore, the setting element is disposed at least partially or completely in the fitting housing and/or the outlet. The setting element preferably does not protrude from the fitting housing or the outlet. As a result, the sanitary fitting can be mounted particularly close to a wall. The sanitary fitting is also suitable for left-handed people. Furthermore, the mixing valve is at least partially open in each set position of the setting element, so that in each set position of the setting element the cold water, hot water, or mixed water can be conducted from the mixing valve via a mixed water channel to a valve. The mixed water channel in this case extends at least partially through the fitting housing and/or the outlet. Removal of cold water, hot water, or mixed water can be activated or deactivated by the valve and a removal volume can be set. The removal volume is in particular a liquid volume of the liquid removed per unit of time. Because the mixing valve is at least partially open regardless of the set position of the setting element, the removal of the liquid can be activated by the valve at any time. This reduces the operating effort for the sanitary fitting.

In addition, the setting element can be designed in the manner of an adjusting ring. As a result, the setting element is formed ring-shaped and can surround the fitting housing or the outlet by 360°. As a result, the setting element is particularly easily adjustable with one hand.

The setting element can be guided in at least one sliding guide. The sliding guide is disposed in particular on the fitting housing or the outlet and serves to guide the setting element along the surface of the fitting housing or the outlet. The setting element can preferably be guided (only) in two opposite directions in the at least one sliding guide.

The setting element can be rotatable about a longitudinal axis of the fitting housing or an outlet of the fitting housing.

The setting element can be coupled to a spindle of the mixing valve. The spindle of the mixing valve can be rotated by the setting element in particular for setting the mixed water temperature. Alternatively, the setting element can also control valve elements of the mixing valve via a cam disc.

The setting element can be at least partially embedded in the surface of the fitting housing or of the outlet. For this purpose, the fitting housing or the outlet can have, for example, a receptacle or a groove in which the setting element is at least partially placed and/or movable. The setting element is preferably completely embedded in the surface of the fitting housing or outlet.

The setting element can be flush with the surface of the fitting housing (or the outlet). As a result, the sanitary fitting is particularly easy to clean.

The valve can be pressed to open or close the sanitary fitting. For this purpose, the valve can have a push button.

The valve can be at least partially rotatable for setting a mixed water removal volume. For this purpose, the valve can have in particular a rotary knob. The rotary knob can at least partially surround the push button. In addition, the rotary knob and the push button can also be made in one piece.

The valve can be disposed at a longitudinal end of the fitting housing. As a result, the valve can be actuated particularly easily by a user of the sanitary fitting.

Further scope of applicability of the present invention will become apparent from the detailed description given hereinafter. However, it should be understood that the detailed description and specific examples, while indicating preferred embodiments of the invention, are given by way of illustration only, since various changes, combinations, and modifications within the spirit and scope of the invention will become apparent to those skilled in the art from this detailed description.

BRIEF DESCRIPTION OF THE DRAWINGS

The present invention will become more fully understood from the detailed description given hereinbelow and the accompanying drawings which are given by way of illustration only, and thus, are not limitive of the present invention, and wherein.

DETAILED DESCRIPTION

Figure 1:
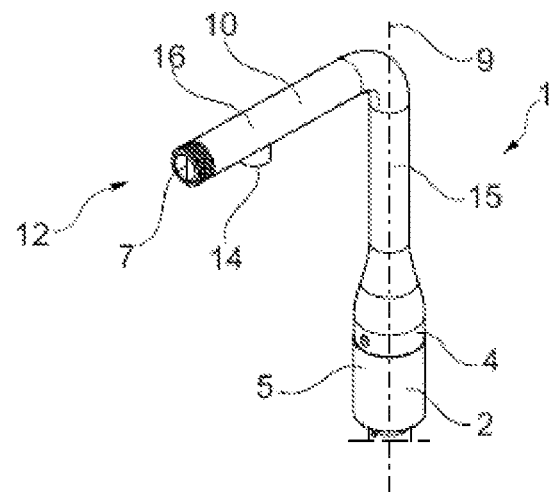
FIG. 1 shows a sanitary fitting in a perspective view.

FIG. 1 shows sanitary fitting 1 in a perspective view. Sanitary fitting 1 has a fitting housing 2 which can be attached, for example, to a countertop or to a kitchen sink. Fitting housing 2 comprises an outlet 10 which is attached to fitting housing 2 rotatable about a first longitudinal axis 9 of fitting housing 2. Outlet 10 has a vertical section 15 and a horizontal section 16, an outlet opening 14 for a mixed water being formed on horizontal section 16. A mixing valve 3, not visible here, for mixing cold water and hot water to form the mixed water is disposed in fitting housing 2. Mixing valve 3 can be actuated by a setting element 4 for setting a mixed water temperature. Setting element 4 is adjustable along a surface 5 of fitting housing 2 and is designed here in the manner of an adjusting ring. Fitting housing 2 can also be designed in two parts. In particular, a first housing part of fitting housing 2 can be disposed at least partially below setting element 4 and a second housing part of fitting housing 2 at least partially above setting element 4. The first housing part and the second housing part can in particular be connected to one another or attached to one another. When setting element 4 is operated along surface 5, setting element 4 is rotated about first longitudinal axis 9 of fitting housing 2. Setting element 4 is also embedded in surface 5 of fitting housing 2, so that setting element 4 is (essentially) flush with surface 5. The mixed water can be conducted via a mixed water channel 6, shown in FIG. 2, to a valve 7 disposed on a longitudinal end 12. A removal of the mixed water via outlet opening 14 can be activated and deactivated via valve 7. Furthermore, valve 7 is rotatable in order to set a mixed water removal volume.

Figure 2:
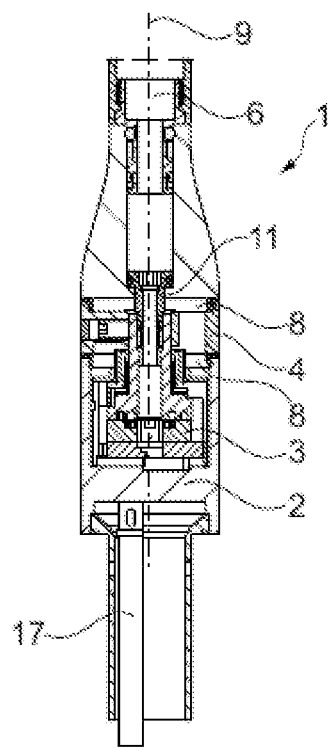
FIG. 2 shows the sanitary fitting in a longitudinal section in the area of a mixing valve.

FIG. 2 shows sanitary fitting 1 in a longitudinal section in the area of mixing valve 3. The mixing valve can be supplied with cold water via a cold water line 17 and hot water via a hot water line. The cold water and hot water can be mixed by the mixing valve to form mixed water with a desired mixed water temperature. The mixed water can then be conducted via mixed water channel 6 to valve 7 shown in FIG. 1. Setting element 4 is coupled to a spindle 11 of mixing valve 3 for setting the mixed water temperature (here by way of example) and is rotatable about first longitudinal axis 9 of fitting housing 2. For this purpose, setting element 4 is guided in two sliding guides 8 of fitting housing 2. Sliding guides 8 are designed ring-shaped for this purpose. Mixing valve 3 is open in every set position of setting element 4, so that cold water, hot water, or mixed water can flow at any time via mixed water channel 6 to valve 7 shown in FIG. 1. In other words, valve 7 is always acted upon with cold water, hot water, or mixed water, so that regardless of the set position of setting element 4, cold water, hot water, or mixed water can be removed via outlet opening 14.

Figure 3:
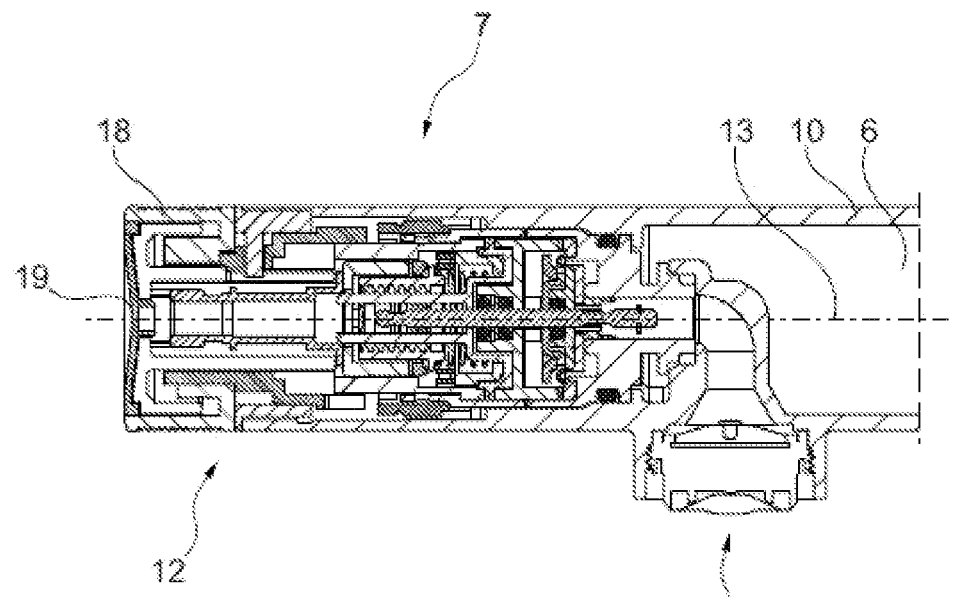
FIG. 3 shows the sanitary fitting in longitudinal section in the area of a valve.

FIG. 3 shows valve 7 at longitudinal end 12 of outlet 10 in the longitudinal section. The cold water, hot water, or mixed water can be conducted to valve 7 via mixed water channel 6 into outlet 10. Valve 7 comprises a push button 19 which can be adjusted to open and close valve 7 by pressing in a translational manner parallel to a second longitudinal axis 13. Further, valve 7 comprises a rotary knob 18 which at least partially surrounds push button 19. Rotary knob 18 can be rotated about second longitudinal axis 13 in order to set a removal volume of cold water, hot water, or mixed water.

Figure 4:
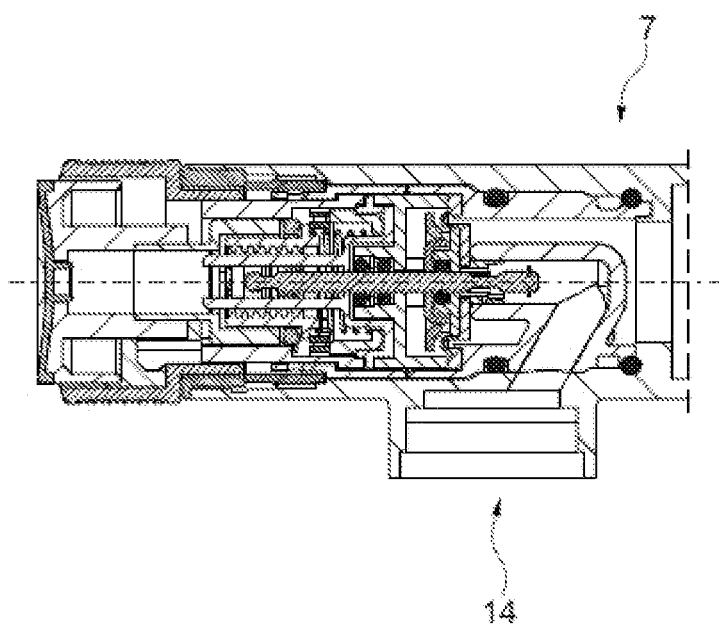
FIG. 4 shows the valve in a closed position.
Figure 5:
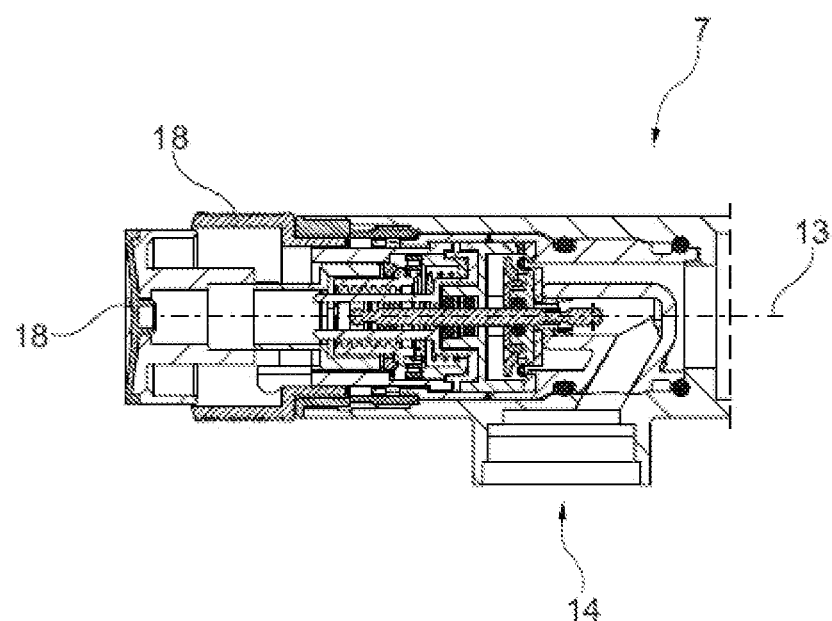
FIG. 5 shows the valve in an open position.

FIG. 4 shows valve 7 in longitudinal section. In the operating situation shown here, valve 7 is closed so that no liquid is discharged via outlet opening 14. FIG. 5 shows valve 7 in longitudinal section after push button 19 has been pressed. As a result, push button 19 was raised out of valve 7 parallel to second longitudinal axis 13. In the operating position shown in FIG. 5, valve 7 is open, so that liquid can flow out via outlet opening 14 with a removal volume set via rotary knob 18.

A sanitary fitting can be mounted close to a wall and operated with little effort with the present invention.

The invention being thus described, it will be obvious that the same may be varied in many ways. Such variations are not to be regarded as a departure from the spirit and scope of the invention, and all such modifications as would be obvious to one skilled in the art are to be included within the scope of the following claims.

What is claimed is:

1. A sanitary fitting comprising:
   a fitting housing having a first section and a second section, the first section extending along a first longitudinal axis and the second section extending along a second longitudinal axis;
   a mixing valve to mix cold water and hot water to produce mixed water;
   a setting element to set a mixed water temperature of the mixed water, the setting element being adjustable along a surface of the fitting housing; and
   a mixed water channel through which the mixed water is conducted from the mixing valve to a valve, a removal volume of the mixed water being settable via the valve,
   wherein the valve includes a push button that is pressed along the second longitudinal axis to open and close the valve to start and stop a discharge of the mixed water out of the sanitary fitting, wherein the valve includes a rotary knob that is rotatable for setting the removal volume of the mixed water,
   wherein the second section of the fitting housing includes the push button and the rotary knob, and wherein the rotary knob rotates about the second longitudinal axis of the second section of the fitting housing.

2. The sanitary fitting according to claim 1, wherein the setting element is designed in the manner of an adjusting ring.

3. The sanitary fitting according to claim 1, wherein the setting element is guided in at least one sliding guide.

4. The sanitary fitting according to claim 1, wherein the setting element is rotatable about the first longitudinal axis of the fitting housing or an outlet of the fitting housing.

5. The sanitary fitting according to claim 1, wherein the setting element is coupled to a spindle of the mixing valve.

6. The sanitary fitting according to claim 1, wherein the setting element is at least partially embedded in the surface of the fitting housing.

7. The sanitary fitting according to claim 1, wherein the setting element is flush with the surface of the fitting housing.

8. The sanitary fitting according to claim 1, wherein the valve is disposed at a longitudinal end of the fitting housing.

9. The sanitary fitting according to claim 1, wherein a first end of the fitting housing contacts a surface upon which the fitting housing is mounted and an opposing second end of the fitting housing has an outlet through which the mixed water is discharged out of the sanitary fitting, and wherein the push-button and the rotary knob are provided at the second end of the fitting housing.

10. The sanitary fitting according to claim 9, wherein the rotary knob at least partially surrounds the push button.

11. The sanitary fitting according to claim 1, wherein the second longitudinal axis is angled with respect to the first longitudinal axis.

12. The sanitary fitting according to claim 10, wherein an outer circumferential surface of the rotary knob has a same diameter as an outer circumferential surface of the second section of the fitting housing.

* * * * *